(12) United States Patent
Allen

(10) Patent No.: US 6,251,201 B1
(45) Date of Patent: Jun. 26, 2001

(54) METHOD AND APPARATUS FOR DIVIDING A CONDUIT INTO COMPARTMENTS

(75) Inventor: Jerry L. Allen, Westfield Center, OH (US)

(73) Assignee: TVC Communications, Inc., Annville, PA (US)

( * ) Notice: Subject to any disclaimer, the term of this patent is extended or adjusted under 35 U.S.C. 154(b) by 0 days.

(21) Appl. No.: 09/705,296

(22) Filed: Nov. 3, 2000

Related U.S. Application Data

(62) Division of application No. 09/338,364, filed on Jun. 23, 1999.

(51) Int. Cl.[7] .................................................. H01B 13/00
(52) U.S. Cl. .......................... 156/47; 156/55; 174/68.1; 29/868
(58) Field of Search .................. 174/68.1, 70 C, 174/95, 96, 98, 99 R, 135, 136, 48; 138/116, 117; 254/134.3 PA, 134.3 CL, 134.3 FT, 134.3 SC; 29/868, 869, 876, 877; 156/47, 49, 55

(56) References Cited

U.S. PATENT DOCUMENTS

| | | | |
|---|---|---|---|
| 4,070,543 * | 1/1978 | Thompson et al. | 156/49 |
| 4,096,007 * | 6/1978 | Braunling et al. | 156/55 |
| 4,399,319 | 8/1983 | Zinn | 174/47 |
| 4,582,093 | 4/1986 | Hubbard et al. | 138/111 |
| 4,729,409 | 3/1988 | Paul | 138/115 |
| 5,069,254 | 12/1991 | Vogelsang | 138/111 |
| 5,236,016 | 8/1993 | Vogelsang | 138/115 |
| 5,399,812 | 3/1995 | Woszczyna et al. | 174/97 |
| 5,442,136 | 8/1995 | Allen | 174/95 |
| 5,587,115 | 12/1996 | Allen | 264/1.24 |
| 5,922,995 | 7/1999 | Allen | 174/95 |

* cited by examiner

Primary Examiner—Dean A. Reichard
Assistant Examiner—Adolfo Nino
(74) Attorney, Agent, or Firm—Renner, Kenner, Greive, Bobak, Taylor & Weber

(57) ABSTRACT

A system for dividing a conduit (12) into a plurality of compartments (20–24) includes an insert (10) which is formed by attaching a plurality of layers of a pliant material (14–17) near their lateral edges (18). The insert can be formed with a cable (25), a rope (26) or a tape (27) pre-positioned between the layers (14–17) or the cable (25), rope (26) or tape (27) can be positioned in the respective compartments (20–22) after the insert (10) is installed in the conduit (12).

11 Claims, 2 Drawing Sheets

METHOD AND APPARATUS FOR DIVIDING A CONDUIT INTO COMPARTMENTS

This application is a division of application Ser. No. 09/338,364, filed Jun. 23, 1999.

TECHNICAL FIELD

This invention relates to conduits of the type that might be employed to carry cables, such as fiber optic cables, underground. More particularly, this invention relates to a method and apparatus for dividing such conduits into compartments so that multiple cables can readily be carried in the same conduit.

BACKGROUND ART

Modern communication technology utilizes cables, such as fiber optic cables, most often positioned in a conduit or casing which is buried underground. The installation of such an underground cabling network is a tedious and expensive project. First, usually a trench must be dug and then the conduit, typically of two to four inches in diameter and oftentimes extending for miles in length, is positioned in the trench. The communications cable is then installed in the conduit, either by pulling or pushing the same therethrough. The trench is then filled and the communications network is ready to be utilized, being housed in the conduit safe from the environment of water, gnawing animals and the like.

One of the problems with these systems is that a conduit, particularly of a small size, usually only carries one cable which is positioned therein in a random, sinuous path thereby essentially prohibiting another cable from being readily installed in the existing conduit.

Thus, if at a later date the communications system needs to be expanded, as by the addition of another cable, the entire installation process needs to be repeated—at a redundant expense. Bigger conduits, such as those of four inches in diameter or larger, often have smaller conduits placed inside of them. But each of these conduits can only house one cable, and in addition, because of the wall thickness of these internal conduits, much space in the larger conduit is wasted.

One solution to the problem, which has been suggested, is to introduce a strip of material, usually formed of a polyethylene plastic, into the existing conduit which effectively pushes the existing cable to one side in the conduit thereby creating a second chamber in the conduit for the unobstructed installation of a second cable. However, while the polyethylene material is somewhat resilient, such a process is at times difficult in that most underground conduits include many bends and turns which even this resilient material has trouble navigating. As a result, a great deal of force must be utilized to move the strip of material past the existing cable, while at the same time taking care that the strip of material does not damage the existing cable.

As a possible solution to this problem, it has been suggested to form the strip of material with a plurality of notches to allow it to be more flexible and to twist as it is navigating the turns in the conduit. While the notched strip of material has been found to make installation easier, its manufacture is more costly and the possibility of damage to the existing cable is still prevalent.

Most fundamentally, there are other drawbacks to the conduit divider systems described above. First, a conduit having such dividers is only divided into two compartments thereby limiting the capacity of the conduit to two cables. While it might be feasible to further divide the already divided conduit by introducing other strips of material, not only would the installation process have to be repeated, but also that process would be more difficult as there would be less operating space to negotiate turns. Second, and importantly, these divider strips themselves take up valuable and potentially useable space in the conduit, space which could, with an effective divider system, be utilized for additional cables.

DISCLOSURE OF THE INVENTION

It is thus an object of the present invention to provide such an effective conduit divider system which does not take up significant space in the conduit thereby permitting a larger number of cables to be carried by the conduit.

It is another object of the present invention to provide a conduit divider system, as above, which utilizes a conduit insert made of a lightweight, thin, pliant, fabric material which can deform to take the shape of the conduit in which it is positioned and the shape of the cable that it may be housing, thereby minimizing unusable space in the conduit.

It is a further object of the present invention to provide a conduit divider system, as above, in which the insert can be configured to form a significant number of cable compartments.

It is an additional object of the present invention to provide a conduit divider system, as above, wherein a cable in a compartment is isolated from a cable in another compartment and is therefore protected when a new cable is being installed into a compartment in the conduit.

It is yet another object of the present invention to provide a conduit divider system, as above, in which the insert is inexpensive to manufacture and easy to install into a conduit.

It is a still further object of the present invention to provide a conduit divider system, as above, which can readily be stored on rolls which can be used at the installation site.

It is yet a further object of the present invention to provide a conduit divider system, as above, in which cables and/or pulling ropes or tapes may be pre-installed in the compartments.

These and other objects of the present invention, as well as the advantages thereof over existing prior art forms, which will become apparent from the description to follow, are accomplished by the improvements hereinafter described and claimed.

In general, an apparatus for dividing a longitudinally extending conduit into compartments includes a longitudinally extending insert. The insert is formed of at least two layers of a pliant material which are attached to each other along their lateral edges to form at least one compartment between the layers.

The present invention also includes a method of dividing a longitudinally extending conduit into compartments, which method includes the steps of forming at least two layers of a longitudinally extending, pliant material having lateral edges, attaching the lateral edges so as to form at least one compartment between the layers, and inserting the attached layers into the conduit.

A preferred exemplary conduit divider system incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
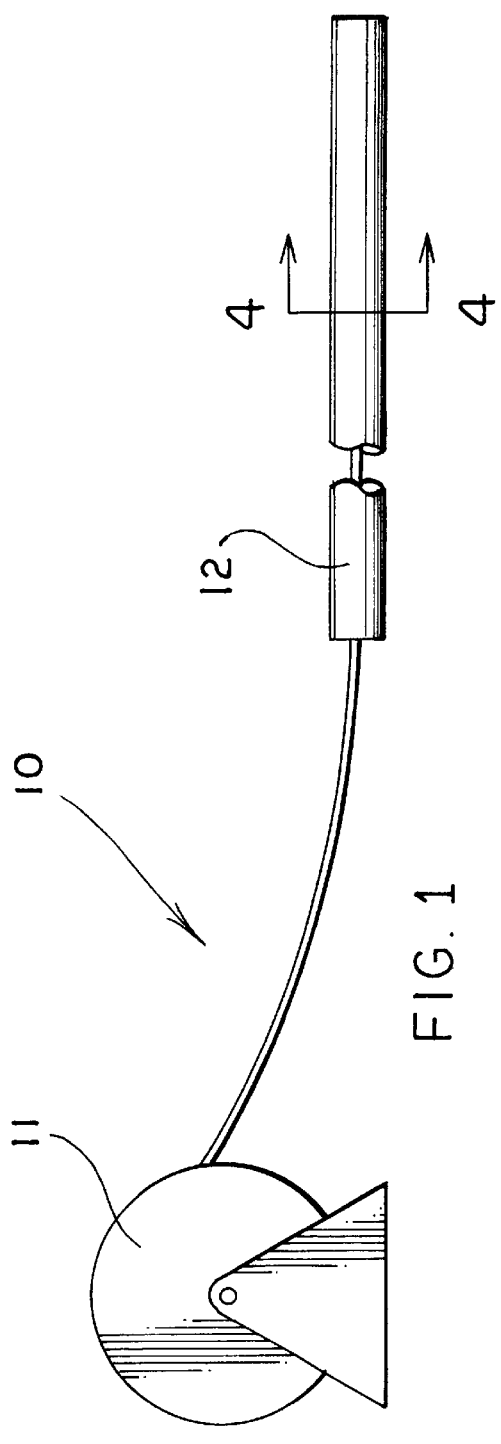
FIG. 1 is a fragmented schematic representation of a divider insert, made in accordance with the present invention, being inserted into a conduit.
Figure 2:
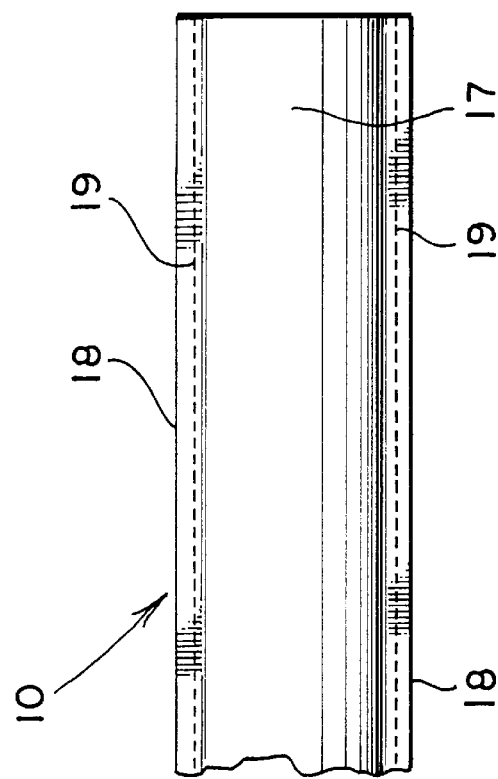
FIG. 2 is a fragmented top plan view of the divider insert.

A conduit divider system made in accordance with the present invention includes an insert, generally indicated by the numeral 10. As will hereinafter be described in more detail, insert 10 is made of a longitudinally extending pliant material, and several thousand feet of insert 10 may be provided on a roll 11 to be inserted in a conduit 12. Conduit 12 is typically used for the underground confinement of a communications cable, such as fiber optic cable 13 shown in FIG. 4, and is usually made of a suitable plastic material having a typical diameter of four inches. However, other sized conduits 12 are also prevalently used in this environment. Conduit 12 typically could extend longitudinally for several miles underground, and insert 10 can be pulled or blown into conduit 12 from roll 11 by conventional means known in the art.

Insert 10 is formed with a plurality of thin, pliant layers of material, four thin layers 14, 15, 16 and 17 being shown by way of example. Layers 14–17 have lateral edges 18 and are attached, as by stitching 19, near lateral edges 18. While stitching 19 is shown as the preferred manner to attach layers 14–17, it should be evident, particularly in view of the precise material from which insert 10 is fabricated, that other attachment systems, such as fusing or the like, could be employed.

Figure 4:
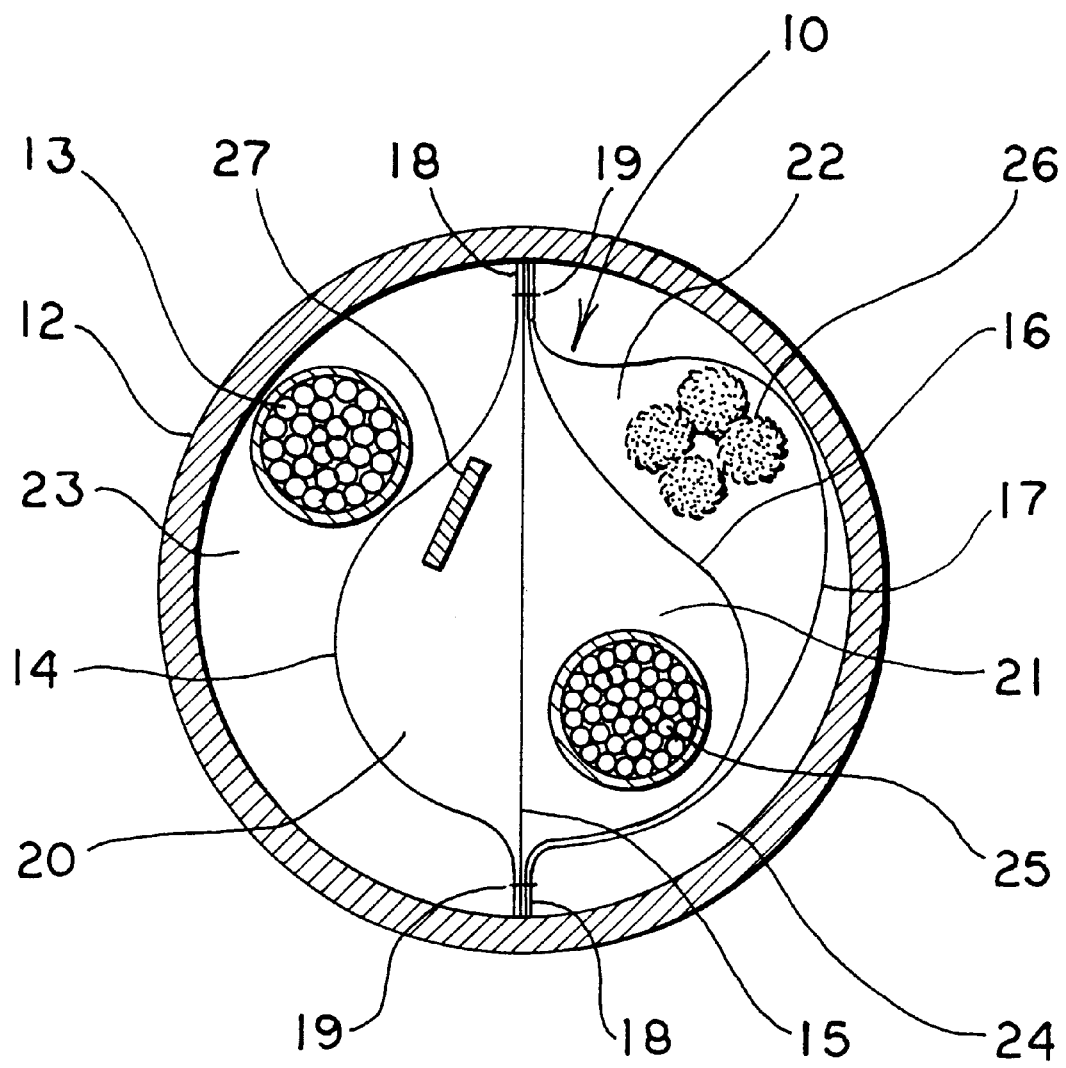
FIG. 4, is a sectional view taken substantially along line 4—4 of FIG. 1 and showing the insert in the conduit.

Insert 10 thus forms longitudinally extending compartments 20, 21 and 22, compartment 20 being formed between layers 14 and 15, compartment 21 being formed between layers 15 and 16, and compartment 22 being formed between layers 16 and 17. Insert 10 may be formed with any number of layers, therefore forming any number of compartments, as desired for a particular application. Moreover, when installed in conduit 12, as shown in FIG. 4, two more compartments 23 and 24 are formed between conduit 12 and layers 14 and 17, respectively. Thus, cable 13 is shown as being positioned in compartment 23 and outside of insert 10. Because of the pliable characteristics of insert 10, that is, because it can deform to take any shape necessary as dictated by conduit 12 or the cables housed therein, it has been found that up to four cables could readily be positioned in a two inch diameter conduit, and up to twelve cables could readily be positioned in a four inch diameter conduit, over twice as many as known in the art.

In order to easily install insert 10 in conduit 12, and in order to easily install cables and the like into the compartments 20–24 formed in conduit 12, it is preferable that the layers 14–17 of insert 10 be formed of a pliant, lightweight natural or synthetic fabric having a low coefficient of friction, high abrasion resistance, and high tear resistance. The fabric should also not be water absorbent, and it need only have a suitable tensile strength to be pulled into conduit 12. While any fabric with such characteristics could be used to form insert 10, it has been determined that a fabric purchased from Milliken & Company of Spartanburg, S.C., known as monofilament fabric style No. 072210, pattern 321, finish 1021, is quite satisfactory to form layers 14–17 of insert 10. By utilizing this or an equivalent fabric, insert 10 is easily positionable in conduit 12 and items, such as cable 13, are readily positionable in the compartments 20–24 formed therein.

Insert 10 may be installed in an empty conduit 12 or may be installed in a conduit 12 having one or more preexisting cables therein. For example, as shown in FIG. 4, insert 10 has been positioned in conduit 12 already having a cable 13 therein. As such, when insert 10 is being inserted into conduit 12, it pushes cable 13 aside, that is, into the longitudinally extending compartment 23 being formed as insert 10 moves longitudinally within conduit 12.

In addition, insert 10 may be installed into conduit 12 with its compartments 20–22 empty, or it may have a cable or other items positioned in compartments 20–22 when it is fabricated. That is, as shown in FIG. 4, a cable 25 can be positioned between layers 15 and 16 before their lateral edges 18 are stitched together. Then, installing insert 10 will also install a cable, such as cable 25, at the same time. Of course, alternatively, a cable, such as cables 13 or 25, can be readily inserted into any compartment of insert 10 after it has been positioned in conduit 12.

In order to insert cables into a conduit such as conduit 12, it is a standard practice to insert a rope or a tape into the conduit and then when it becomes desirable to install a cable into the conduit, it is attached to the rope or tape and the rope or tape is then pulled out of the conduit thereby pulling the cable into the conduit. FIG. 4 shows a rope 26 in compartment 22 and a tape 27 in compartment 20. Like cable 25, rope 26 and/or tape 27 can be pre-inserted into insert 10 when it is formed, or they could be inserted into any empty compartment of insert 10 at a later time for subsequent installation of another cable.

Because of the pliability of insert 10, that is, because it can be deformed to almost any shape, and because it has no memory coming off of roll 11, it will easily move through conduit 12 when being installed therein. In certain situations, it may even be desirable to make insert 10 somewhat stiffer, and in that regard, stiffener rods (not shown) might be sewn into insert 10, as at the lateral edges 18 thereof. Moreover, by virtue of its pliability, the lateral width of insert 10 is not critical. While such could even slightly exceed the diameter of conduit 12, preferably the width of insert 10 is generally equal to or slightly less than the diameter of conduit 12.

Figure 3:
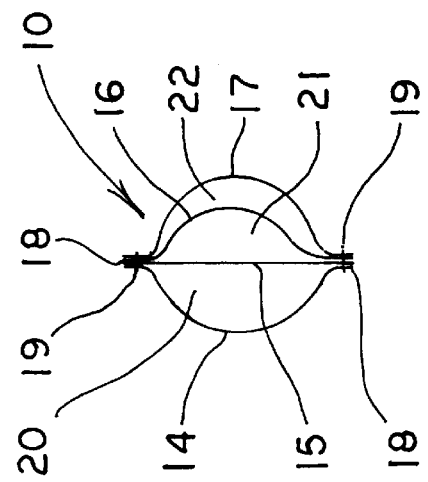
FIG. 3 is an end elevational view of the divider insert.

In order to preform insert 10 into cognizable compartments, it is preferable that the lateral width of the individual layers 14–17 be different. Thus, as shown in FIGS. 3 and 4, before applying stitching 19, layer 15 has a lesser lateral width than layer 14 and layer 16 which, in turn, has a lesser lateral width than layer 17. Then when stitched at their lateral edges, layers 14, 16 and 17, for example, will buckle to form compartments 20–22. The size of the compartments will obviously vary dependent on the selected length of a layer forming the compartment, and it should be evident that if one wanted to employ, for example, ten layers to make nine compartments, the lateral width of the layers would more closely approximate each other, than that shown in FIG. 4, to make smaller compartments. All of this can be accomplished without taking up significant useable space in conduit 12.

It should also be apparent that the layers 14–17 totally protect any cable, such as cables 13 and 25, positioned within insert 10. Thus, if, for example, one were to attach a new cable to rope 26 or tape 17 and pull that cable into insert 10, it will easily pass therethrough without contacting or being impeded by cables 13 and 25. If desirable, particularly when anticipating packing many cables into a conduit, the layers of insert 10 could be pre-lubricated to assist in the installation of a conduit into a compartment thereof.

In light of the foregoing, it should thus be evident that a conduit divider system employing an insert constructed as described herein substantially improves the art and otherwise accomplishes the objects of the present invention.

What is claimed is:

1. A method of dividing a longitudinally extending conduit into compartments comprising the steps of forming at least two layers of a longitudinally extending pliant material having lateral edges, attaching the layers near their lateral edges so as to form at least one compartment between the layers, and inserting the attached layers into the conduit.

2. A method according to claim 1 wherein the step of attaching is accomplished by stitching the layers together near their lateral edges.

3. A method according to claim 1 further comprising the step of positioning the attached layers on a roll, the step of inserting being accomplished by removing the attached layers from the roll.

4. A method according to claim 1 further comprising the step of lubricating the attached layers.

5. A method according to claim 1 wherein the at least two layers are formed with a different lateral width.

6. A method according to claim 5 wherein said step of attaching causes one of the layers to buckle to form the compartment.

7. A method according to claim 1 further comprising the step of positioning a cable between the layers before attaching the layers.

8. A method according to claim 1 further comprising the step of positioning a rope between the layers before attaching the layers.

9. A method according to claim 1 further comprising the step of positioning a tape between the layers before attaching the layers.

10. A method of dividing a longitudinally extending conduit into compartments comprising the steps of forming at least two layers of a longitudinally extending pliant material, forming at least one compartment between the layers, and inserting the layers into the conduit.

11. A method according to claim 10 wherein the layers have lateral edges which are connected to each other to effect the step of forming the at least one compartment.

* * * * *